(12) United States Patent
Matsuo (10) Patent No.: US 12,313,996 B2
(45) Date of Patent: May 27, 2025

(54) IMAGE FORMING APPARATUS AND IMAGE FORMING METHOD

(71) Applicant: Konica Minolta, Inc., Tokyo (JP)

(72) Inventor: Masahiro Matsuo, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/465,367

(22) Filed: Sep. 12, 2023

(65) Prior Publication Data
US 2024/0085842 A1    Mar. 14, 2024

(30) Foreign Application Priority Data

Sep. 12, 2022 (JP) ................................ 2022-144931

(51) Int. Cl.
*G03G 15/00* (2006.01)
(52) U.S. Cl.
CPC ....... *G03G 15/556* (2013.01); *G03G 15/5012* (2013.01); *G03G 15/6517* (2013.01); *G03G 2221/1663* (2013.01)
(58) Field of Classification Search
CPC ........... G03G 15/5012; G03G 15/5016; G03G 15/502; G03G 15/553; G03G 15/556; G03G 15/6517; G03G 2221/1663
See application file for complete search history.

(56) References Cited

U.S. PATENT DOCUMENTS

| | | | |
|---|---|---|---|
| 2009/0220253 A1 | 9/2009 | Takiguchi | |
| 2010/0046966 A1* | 2/2010 | Ito .................... | G03G 15/0856 399/27 |
| 2010/0158549 A1 | 6/2010 | Shiraishi | |
| 2017/0139361 A1* | 5/2017 | Nishi ................ | G03G 15/5012 |
| 2017/0336744 A1* | 11/2017 | Noda ................ | G03G 15/6564 |
| 2019/0302672 A1 | 10/2019 | Osawa et al. | |
| 2020/0012221 A1* | 1/2020 | Matsuo ............. | G03G 15/652 |
| 2021/0039398 A1 | 2/2021 | Kikuchi | |
| 2021/0103246 A1* | 4/2021 | Morihara .......... | G03G 15/556 |
| 2021/0311416 A1* | 10/2021 | Masuda ............ | G03G 15/6588 |

(Continued)

FOREIGN PATENT DOCUMENTS

| | | |
|---|---|---|
| JP | 2005111707 A | 4/2005 |
| JP | 2007281707 A | 10/2007 |
| JP | 2009226859 A | 10/2009 |

(Continued)

OTHER PUBLICATIONS

EPO Extended European Search Report issued in corresponding EP Application No. 23195082.5; mailed Jan. 29, 2024; 10 pages.

*Primary Examiner* — Carla J Therrien
(74) *Attorney, Agent, or Firm* — CANTOR COLBURN LLP (57) ABSTRACT

An image forming apparatus includes: a first hardware processor that, when receiving an execution command of a job related to formation of an image on a continuous recording medium, calculates a consumption amount of a recording agent on a basis of information of the job; and a second hardware processor that determines whether the recording agent is sufficient on a basis of the consumption amount, wherein in a case where the second hardware processor determines that the recording agent is insufficient, a notification that the recording agent is insufficient is made.

13 Claims, 6 Drawing Sheets

(56) References Cited

U.S. PATENT DOCUMENTS

2022/0035294 A1    2/2022   Miyazaki

FOREIGN PATENT DOCUMENTS

| JP | 2010145864 A | 7/2010 |
| JP | 2015055673 A | 3/2015 |
| JP | 2017096991 A | 6/2017 |
| JP | 2020028351 A | 2/2020 |
| JP | 2022028351 A | 2/2022 |

\* cited by examiner

| | |
|---|---|
| JOB No. | 01 |
| FILE NAME | abcd |
| PAPER TYPE | TACK_PP |
| THICKNESS | 121–190 μm |
| PRINT TIME | 105 min |
| PRINT SPEED | 20 mpm |
| NUMBER OF PAGES | 5 |
| NUMBER OF COPIES | 1000 |

| | |
|---|---|
| Y | SUFFICIENT |
| M | INSUFFICIENT: SCHEDULED TO BE REPLACED IN 90 min |
| C | SUFFICIENT |
| K | SUFFICIENT |
| W | INSUFFICIENT: SCHEDULED TO BE PLACED IN 20 min |

[ PRINT ]   [ CANCEL ]

IMAGE FORMING APPARATUS AND IMAGE FORMING METHOD

CROSS REFERENCE TO RELATED APPLICATIONS

The present invention claims priority under 35 U.S.C. § 119 to Japanese Application, 2022-144931, filed on filed on Sep. 12, 2022, the entire contents of which being incorporated herein by reference.

BACKGROUND

Technological Field

The present invention relates to an image forming apparatus and an image forming method.

Description of the Related Art

Figure 1:
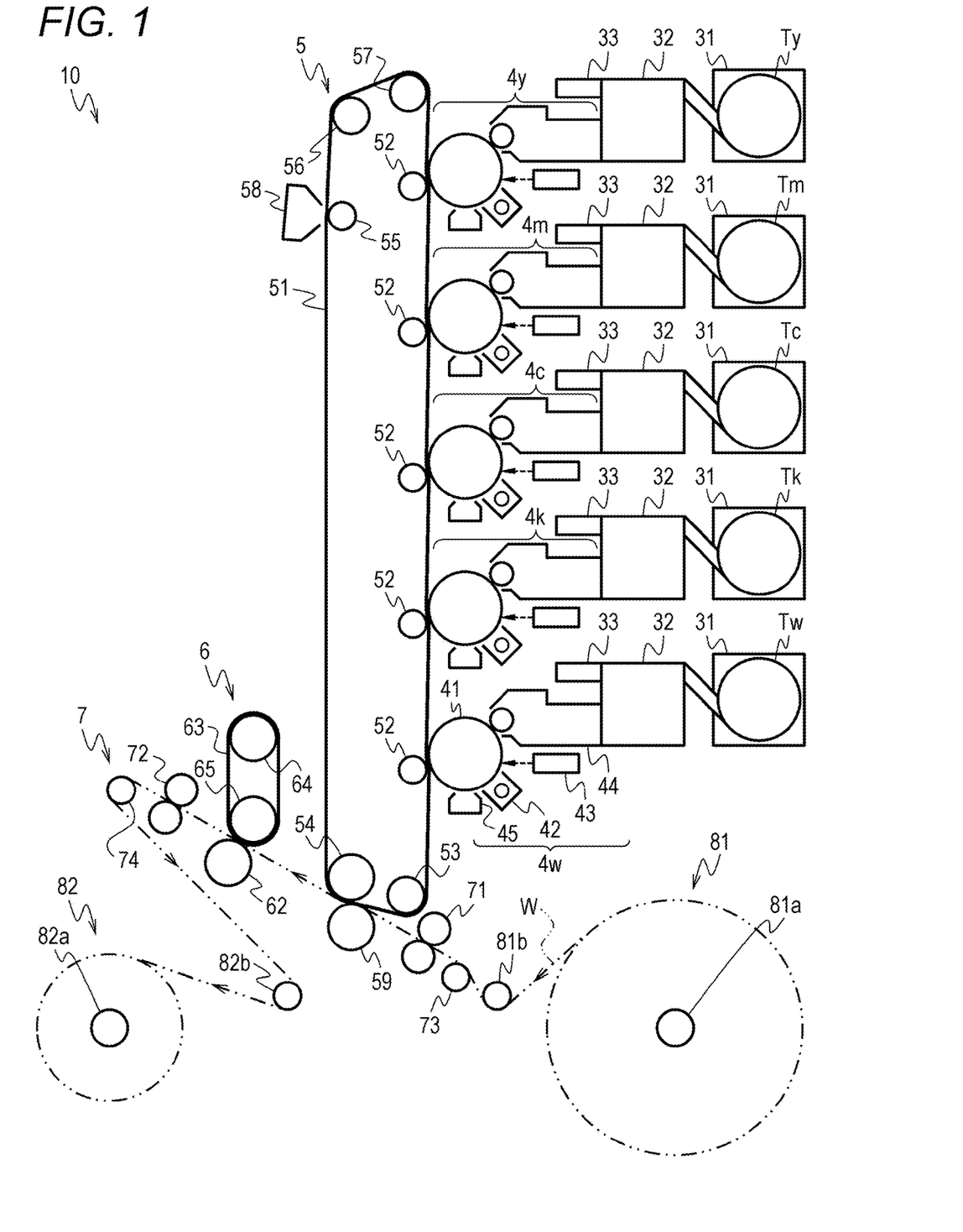
FIG. 1 is a schematic configuration diagram of an image forming apparatus according to an embodiment of the present invention.

An industrial image forming apparatus used for manufacturing a label, a wrapping sheet, or the like attached to a packaging container feeds and conveys a continuous recording medium such as a continuous sheet wound in a roll, prints a large number of identical images (unit images) in an array on the continuous recording medium, and delivers a printed matter wound in a roll. In some cases, the length (the print distance) of the printed matter in one job ranges from several tens to several hundreds of meters, and thus, the consumption amount of recording agents such as ink and toner is also large. In particular, in an electrophotographic image forming apparatus (a laser printer or the like) using a transparent plastic film such as polyethylene terephthalate (PET) as a recording medium, in order to prevent the image of a manufactured label or the like from being seen through and an object to which the label is attached from being seen, a base is formed (lined) by attaching a white (W) toner at a high density to the entire area that is the same as the image, so that the consumption of the white toner increases. As an example, as illustrated in FIG. 1, such an image forming apparatus 10 can apply an apparatus of a five-series tandem intermediate transfer system in order to perform printing with toners of five colors obtained by adding W to Y, M, C, and K.

Depending on the image information of the job (the data of the unit image, the number of arrangements of the unit images, and the like) and the remaining amount of the recording agent in the image forming apparatus at the start of the job, the recording agent may be insufficient, and the recording agent may have run out and printing is suspended in the middle of execution (printing) of the job. Therefore, there is disclosed an image forming apparatus that calculates a possible print distance on the basis of image information included in a job and the remaining amount of toner in a toner bottle attached to the image forming apparatus before the start of the job, and in a case where the print distance is insufficient for the print distance requested in the job, that allows an operator to select whether to perform printing until the toner has run out and then temporarily suspend printing or to replace the toner bottle with a new toner bottle fully containing the toner and then perform printing (JP 2010-145864 A). In addition, there is disclosed an image forming apparatus that calculates a toner consumption speed on the basis of image information included in a job and a print speed (a print distance per unit time) of the image forming apparatus, and predicts and makes a notification of the time from the start of printing to when the toner bottle becomes empty on the basis of the remaining amount of toner in the toner bottle (JP 2022-28351 A).

In addition, when an image with a low coverage of a specific color is printed in a large area (a long print distance), the toner of the color remains in a development device while being stirred together with a carrier for a long period of time before being consumed for image formation, so that the toner is worn and deteriorated, and the charge amount is reduced. Therefore, there is disclosed an image forming apparatus that, when it is determined to be necessary on the basis of a coverage of an image included in a job, suspends the job, prints a toner discharge pattern (a refresh band), and then continues the job (JP 6278033 B). In addition, there is disclosed an image forming apparatus that prints a toner discharge pattern on both edges (both ends in a width direction) of a continuous recording medium, specifically, on both outer sides of an image forming area of a job in an image formable area (JP 5741656 B). Furthermore, there is disclosed an image forming apparatus that calculates a print distance at which printing can be continuously performed before the start of printing on the basis of image information of a job, in a case where the print distance is insufficient for the print distance of the job, that presents the fact to a user, and performs image adjustment to increase the consumption amount of toner with a low coverage by the selection of the user (JP 2022-028351 A).

In general, when the image forming apparatus detects that the remaining amount of a recording agent in the image forming apparatus become less than a printable value during the execution (printing) of a job, the image forming apparatus forcibly suspends printing and notifies a user of runout of the recording agent and an instruction to refill the recording agent. For example, in an electrophotographic image forming apparatus, when it is detected that the toner density of a developer in a development device is less than a predetermined value and this state continues, printing is forcibly suspended, and notifications of runout of toner and an instruction to replace the toner bottle with a new toner bottle are made. Thereafter, the cartridge is replaced with a new cartridge containing a recording agent by an operator, and when a job restart command is received, the recording agent can be refilled from the cartridge, the job can be restarted, and the remaining image can be printed. However, in the electrophotographic image forming apparatus 10, a toner image is transferred from an intermediate transfer belt 51 to a recording medium W in an intermediate transfer unit 5, and then the adhered toner image is fixed by thermocompression bonding in a fixing unit 6. When the portion of the recording medium W to which the toner image adheres remains in the fixing unit 6 for a long time, the toner image and the recording medium W are deteriorated, and there is a possibility that waste is generated (spoilage occurs). Therefore, when suspending the job, the image forming apparatus 10 conveys the recording medium W and causes at least the portion of the recording medium to which the toner image adheres to pass through the fixing unit 6. In such an image forming apparatus 10, when the job is restarted, the recording medium W includes a blank in which no image is printed at least with the distance between the intermediate transfer unit 5 and the fixing unit 6.

That is, in the image forming apparatus described in JP 2010-145864 A, in a case where printing up to the middle of the job is selected, a blank is included in the printed matter. In general, in a case where a printed matter of a continuous recording medium is supplied to a subsequent process in a state of being wound in a roll, division (die cutting), punching into a predetermined shape, and the like are performed while feeding and conveying the printed matter as in the image forming apparatus. Therefore, if there is a blank with no print, an operation of removing this blank is required. In addition, in the case of a long product or the like of several to several tens of meters such as a masking tape, the yield decreases. In order to avoid this in JP 2010-145864 A, it is only required to replace a toner bottle with a new toner bottle and then execute a job. However, toner bottles whose remaining amount of toner is insufficient for the job but is not necessarily small cannot be used, and thus the running cost decreases.

In addition, the image forming apparatus generally has a certain amount of time, although depending on the structure, from when the cartridge of the recording agent to be replaced by the operator becomes empty to when the recording agent in the image forming apparatus has run out and printing is suspended. In the image forming apparatus described in JP No. 2022-028351 A, by notifying an operator of the predicted time when the toner bottle becomes empty, the operator waits in advance, and when it is detected that the toner bottle becomes empty, quickly replaces the toner bottle with a new toner bottle, so that it is possible to avoid suspension of printing. However, in a case where the remaining amount of toner is small, the toner consumption speed is high, and the toner bottle becomes empty in a short time, there is a possibility that preparation of a new toner bottle by the operator cannot be made in time, and there is room for improvement.

SUMMARY

The present invention has been made in view of the above problems, and an object thereof is to provide an image forming apparatus capable of more reliably preventing suspension of printing due to runout of a recording agent at the time of the execution of a print job.

To achieve the abovementioned object, according to an aspect of the present invention, an image forming apparatus reflecting one aspect of the present invention comprises: a first hardware processor that, when receiving an execution command of a job related to formation of an image on a continuous recording medium, calculates a consumption amount of a recording agent on a basis of information of the job; and a second hardware processor that determines whether the recording agent is sufficient on a basis of the consumption amount, wherein in a case where the second hardware processor determines that the recording agent is insufficient, a notification that the recording agent is insufficient is made.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an image forming apparatus according to a mode for carrying out the present invention (one or more embodiments of the present invention) will be described with reference to the drawings. However, the scope of the invention is not limited to the disclosed embodiments. Note that the size, positional relationship, and the like of the members illustrated in the drawings may be exaggerated in order to clarify the description, and the shape may be simplified. In the following description, the same or similar members are denoted by the same reference numerals, and the description thereof is omitted as appropriate.

[Image Forming Apparatus]

Figure 2:
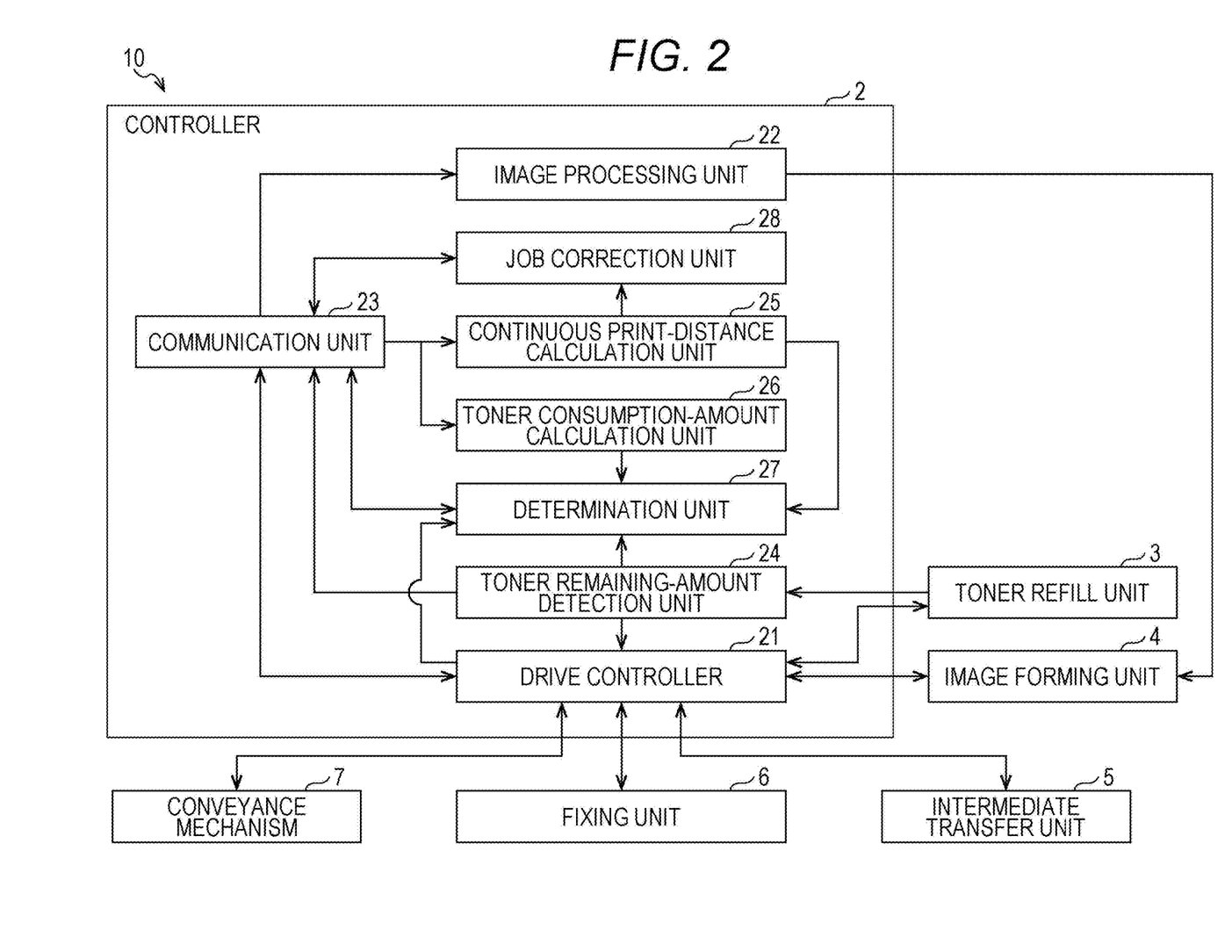
FIG. 2 is a block diagram illustrating a configuration of the image forming apparatus according to an embodiment of the present invention.

FIG. 1 is a schematic diagram of an image forming apparatus according to the present invention and is a configuration diagram as viewed from the side. The image forming apparatus 10 illustrated in FIG. 1 is a full-color-compatible image forming apparatus of a five-series tandem intermediate transfer system and can form a color image and further form a white layer on a base of the color image. The image forming apparatus 10 connects a sheet feeder 81 and a winding device 82 to form a color image on the surface of the long recording medium (continuous recording medium) W such as a continuous sheet. As illustrated in FIG. 1 and FIG. 2, the image forming apparatus 10 includes a controller 2, a toner bottle attachment portion 31 to which each of toner bottles (recording agent storage containers) Ty, Tm, Tc, Tk, and Tw is removably attached, a hopper 32, a sub-hopper 33, five image forming units 4y, 4m, 4c, 4k, and 4w, the intermediate transfer unit 5, the fixing unit 6, a conveyance mechanism 7 that conveys the recording medium W, a cutter that cuts the recording medium W having an image formed thereon, a housing that stores these components, an operation panel, a thermometer that measures room temperature, a lamp that lights up when machine trouble such as toner runout or paper jam occurs, and the like (not illustrated). In the image forming apparatus 10, components other than the controller 2 and the housing are included in a printer engine as a mechanical unit, and perform image forming (printing) processing of forming a toner image (an image) by adhering toner to the surface of the recording medium W while conveying the recording medium W.

(Recording Medium)

The recording medium (the continuous recording medium) W, which is a print object of the image forming apparatus 10, is a long sheet-like member, and is supplied by being wound around a spool (not illustrated) as a jig. The recording medium W has a width compatible with the image forming apparatus 10, and has, for example, a width of about 330 mm or less, which is similar to that of an image forming apparatus for a sheet. The recording medium W is also supplied with a length of, for example, several tens to several thousand meters, and is separated from an unprinted area after printing is completed. The recording medium W is formed of a material with a heat-resistant temperature of about 150° C. or higher in at least a short time (one to several seconds), and for example, paper, a plastic film such as polyethylene terephthalate (PET) or polypropylene (PP), or tack paper in which an adhesive is applied to the back surface thereof and the back surface is releasably bonded to release paper can be used.

(Toner Bottle)

The toner bottles (the recording agent storage containers) Ty, Tm, Tc, Tk, and Tw are containers that store toners of yellow (Y), magenta (M), cyan (C), black (K), and white (W), which are recording agents of the image forming apparatus 10 and are appropriately referred to as toner bottles T when colors are not distinguished from one another. The toner bottle T is a substantially cylindrical container with a discharge port at one end in the axial direction of the cylinder and has spiral ribs on the inner peripheral surface. The toner bottle T is formed of, for example, translucent plastic in which the presence or absence of toner in the toner bottle T can be visually recognized. The toner bottle T is attached to the toner bottle attachment portion 31 of the image forming apparatus 10.

(Controller)

The controller 2 is a printer controller of the image forming apparatus 10, and as illustrated in FIG. 2, includes a drive controller 21 that drives and control the printer engine that includes components other than the controller 2 in the image forming apparatus 10, an image processing unit 22 that performs digital image processing on image data included in job data input from the outside, and a communication unit 23 that is connected to an information terminal such as a PC in a wired or wireless manner to transmit and receive data. The controller 2 further includes a toner remaining-amount detection unit (in-container recording agent remaining amount detector, in-apparatus recording agent remaining amount detector) 24 that detects or calculates the remaining amount of toner in each of the toner bottles Ty, Tm, Tc, Tk, and Tw and the remaining amount of toner in the image forming apparatus 10, a continuous print-distance calculation unit (continuous print distance calculator) 25 that acquires a coverage of an image from image data included in job data and calculates a continuous print distance, a toner consumption amount calculation unit (recording agent consumption amount calculator) 26 that calculates a consumption amount and a consumption speed of toner of each color in a job on the basis of the job data, a determination unit (determinator) 27 that determines whether the job can be executed, and a job correction unit (job corrector) 28 that changes the job data on the basis of a command input from the outside. In order to include these components, the controller 2 includes a central processing unit (CPU), a memory for storing software and temporarily storing input job data, and the like. The operation of each component of the controller 2 will be described in detail in the description of an image forming method by an image forming apparatus to be described later.

(Toner Bottle Attachment Portion)

The toner bottle attachment portion 31 rotatably holds the toner bottle T and enables the toner bottle T to be removed from the back surface (the inner surface in FIG. 1) of the image forming apparatus 10. The toner bottle attachment portion 31 is provided for each of the toner bottles Ty, Tm, Tc, Tk, and Tw, that is, five toner bottle attachment portions are provided in the image forming apparatus 10. The toner bottle attachment portion 31 includes a motor that rotationally drives the toner bottle T and a toner zero detector (recording agent zero detector) that detects that the toner bottle T is empty. When the toner bottle attachment portion 31 rotates the toner bottle T with its cylindrical shaft as a rotation shaft, the toner is stirred in the toner bottle T to move to the discharge port by the ribs on the inner peripheral surface and is discharged. The toner zero detector is, for example, an optical sensor. Note that the toner bottle attachment portion 31, and the hopper 32 and the sub-hopper 33 to be described later are collectively referred to as a toner refill unit 3 as appropriate.

(Hopper and Sub-Hopper)

The hopper 32 and the sub-hopper 33 store and temporarily accumulate the toner discharged from each of the toner bottles Ty, Tm, Tc, Tk, and Tw, and further supply the toner to a development device 44 in each of the image forming units 4y, 4m, 4c, 4k, and 4w. Specifically, the toner is supplied from the toner bottle T to the hopper 32, from the hopper 32 to the sub-hopper 33, and from the sub-hopper 33 to the development device 44. For this purpose, each of the hopper 32 and the sub-hopper 33 includes a housing that stores toner, a screw, a stirring conveyor such as a motor that rotationally drives the screw, and a toner amount detector that detects the amount of the stored toner, which are installed inside the housing. The toner amount detector is, for example, a piezoelectric element that detects whether the toner level is equal to or higher than a predetermined height and can detect whether the amount of toner is equal to or larger than a predetermined value. Since the hopper 32 has a large capacity, the image forming apparatus 10 can continue printing for a certain period of time even after the toner bottle T becomes empty. On the other hand, it is preferable that the sub-hopper 33 has a smaller capacity than the hopper 32, and the toner supply amount to the development device 44 is easily adjusted with high accuracy. Therefore, the sub-hopper 33 preferably uses a stepping motor as the drive source of the stirring conveyor. As described above, since the image forming apparatus 10 includes two or more hoppers, the toner outside the toner bottle T can be secured by the first hopper 32 with a large capacity, and the toner supply amount to the development device 44 can be adjusted with high accuracy by the second sub-hopper 33 with a small capacity. In addition, in a case where the development device 44 adopts a trickle development system, carriers may be supplied to the sub-hopper 33 together with the toner.

(Image Forming Unit)

The image forming units 4y, 4m, 4c, 4k, and 4w form toner images of Y, M, C, K, and W, respectively, and are referred to as an image forming unit 4 as appropriate when colors are not distinguished from each other. Each of the image forming units 4y, 4m, 4c, 4k, and 4w includes a photosensitive drum 41, a charging device 42, an exposure device 43, the development device 44, and a drum cleaning device 45.

The photosensitive drum 41 is an image carrier on which a single color toner image is formed on its surface (its peripheral surface), and is rotationally driven with a direction perpendicular to the paper surface of FIG. 1 as an axis, and faces the charging device 42, the exposure device 43, the development device 44, the intermediate transfer belt 51, and the drum cleaning device 45 in order in a peripheral direction. The charging device 42 uniformly charges the surface of the photosensitive drum 41. The exposure device 43 irradiates the photosensitive drum 41 with a laser beam or the like on the basis of a signal from the image processing unit 22 of the controller 2 to expose an image forming area on the surface to form an electrostatic latent image. The development device 44 includes a housing, a stirring conveyor, a development roller, a toner detector, and the like, which are installed inside the housing. The development device 44 stirs and charges the toner supplied from the toner supply port of the housing with the carrier and supplies the charged toner to the photosensitive drum 41 by the development roller having a magnet therein. Then, the electrostatic latent image on the surface of the photosensitive drum 41 is developed by the action of an electric field force to form a toner image. In addition, the toner detector is, for example, a magnetic permeability sensor, and detects the toner density of a mixture of toner and carrier (a developer) in the housing. Furthermore, the development device 44 can adopt, for example, a trickle development system in which a carrier is supplied together with toner, the developer is circulated in the housing by the stirring conveyor and is discharged from the discharge port of the housing to a waste developer collecting container. The photosensitive drum 41 is brought into pressure contact with the intermediate transfer belt 51 by a primary transfer roller 52 facing the photosensitive drum with the intermediate transfer belt 51 interposed therebetween and transfers the toner image formed on the surface to the intermediate transfer belt 51. The drum cleaning device 45 includes a roll brush and a blade arranged so as to come into contact with the surface of the photosensitive drum 41 and removes toner remaining on the surface of the photosensitive drum 41 after the toner image is transferred to the intermediate transfer belt 51.

(Intermediate Transfer Unit)

The intermediate transfer unit 5 includes the intermediate transfer belt 51 and forms a full-color toner image on the surface thereof. The intermediate transfer unit 5 further includes five primary transfer rollers 52, rollers 53, 54, 56, and 57 that stretch and feed the intermediate transfer belt 51 in a certain direction, a cleaning counter roller 55, a belt cleaning device 58, a toner adhesion amount detector (not illustrated), and a secondary transfer roller 59. The intermediate transfer belt 51 is an image carrier in which a full-color toner image is formed on the surface thereof by toner images being sequentially transferred from the photosensitive drums 41 of the image forming units 4y, 4m, 4c, 4k, and 4w. The intermediate transfer belt 51 is an endless belt, and is stretched by the drive roller 53, the secondary transfer backup roller 54, and the driven rollers 56 and 57 with the outer peripheral side as a surface and is fed in a certain direction (clockwise in FIG. 1).

The primary transfer rollers 52 are arranged to individually face the photosensitive drums 41 of the image forming units 4y, 4m, 4c, 4k, and 4w with the intermediate transfer belt 51 interposed therebetween and bring the intermediate transfer belt 51 into pressure contact with the photosensitive drums 41. The drive roller 53 and the driven rollers 56 and 57 are disposed to feed the intermediate transfer belt 51 on a predetermined track together with the secondary transfer backup roller 54, and the drive roller 53 is rotationally driven to feed the intermediate transfer belt 51 in a certain direction. The drive roller 53 is preferably disposed on the most downstream side in the image forming units 4y, 4m, 4c, 4k, and 4w, that is, on the downstream side of the primary transfer roller 52 facing the photosensitive drum 41 of the image forming unit 4w, and thus is disposed between the primary transfer roller 52 and the secondary transfer backup roller 54. On the other hand, the driven rollers 56 and 57 are disposed between the primary transfer roller 52 facing the photosensitive drum 41 of the image forming unit 4y and the secondary transfer backup roller 54. The secondary transfer backup roller 54 is disposed to face the secondary transfer roller 59 with the intermediate transfer belt 51 interposed therebetween and brings the intermediate transfer belt 51 into pressure contact with the recording medium W conveyed between the intermediate transfer belt 51 and the secondary transfer roller 59 to transfer the toner image on the surface of the intermediate transfer belt 51.

The cleaning counter roller 55 is disposed so as to come into contact with the back surface of the contact portion of the intermediate transfer belt 51 with the belt cleaning device 58. The belt cleaning device 58 includes a roll brush and a blade disposed so as to come into contact with the surface of the intermediate transfer belt 51 and removes toner remaining on the surface of the intermediate transfer belt 51. The toner adhesion amount detector detects the adhesion amount of the toner of each color from the full-color toner image formed on the surface of the intermediate transfer belt 51. The toner adhesion amount detector is, for example, a contact image sensor (CIS), includes a light source such as a light emitting diode (LED) and a light receiving element, and is installed to face the surface of the intermediate transfer belt 51 between the photosensitive drum 41 of the image forming unit 4w on the most downstream and the secondary transfer backup roller 54. The secondary transfer roller 59 is disposed to face the secondary transfer backup roller 54 with the intermediate transfer belt 51 interposed therebetween, and is brought into pressure contact with the intermediate transfer belt 51 while conveying the recording medium W to transfer the toner image on the surface of the intermediate transfer belt 51 to the recording medium W.

(Fixing Unit)

The fixing unit 6 fixes the toner image on the recording medium W by pressurizing and heating the recording medium W having the toner image secondarily transferred thereon at a fixing nip. The fixing unit 6 includes a pressure roller 62, a fixing belt 63, a heating roller 64, and a fixing roller 65. The fixing belt 63 is an endless belt stretched by the heating roller 64 and the fixing roller 65. The heating roller 64 includes a heating unit such as a halogen heater therein and heats the fixing belt 63. The pressure roller 62 is disposed on the downstream side of the secondary transfer roller 59 in the conveyance direction of the recording medium W so as to face the fixing roller 65 with the fixing belt 63 interposed therebetween and is brought into pressure contact with the fixing belt 63 while conveying the recording medium W to form a fixing nip.

(Conveyance Mechanism)

The conveyance mechanism 7 conveys the recording medium W at a predetermined speed in a direction indicated by an arrow, and sequentially passes the recording medium W between the intermediate transfer belt 51 and the secondary transfer roller 59 of the intermediate transfer unit 5, and through the fixing unit 6. The conveyance mechanism 7 includes conveyance rollers 71 and 72, guide rollers 73 and 74, and a motor (not illustrated) that rotationally drives the conveyance rollers 71 and 72. The rollers 71, 72, 73, and 74 stretch the recording medium W in the image forming apparatus 10 and rotate about a rotation shaft extending in a conveyance width direction (a print width direction, the direction perpendicular to the paper surface of FIG. 1). The conveyance roller 71 and the guide roller 73 are disposed on the upstream side in the conveyance direction of the secondary transfer roller 59, and the conveyance roller 72 and the guide roller 74 are disposed on the downstream side of the fixing unit 6. Each of the conveyance rollers 71 and 72 includes two rollers (a roller pair) that rotate in cooperation with each other with the recording medium W interposed therebetween from both sides. In the conveyance rollers 71 and 72, one of the pair of rollers may be an active roller to which rotation is transmitted from a motor, the other may be a driven roller, or both may be active rollers. The guide rollers 73 and 74 are driven shafts that are rotatably supported and rotate as the recording medium W is conveyed. As many conveyance rollers 71 and 72 and the guide rollers 73 and 74 as needed are installed at positions based on the conveyance path of the recording medium W.

(Sheet Feeder)

The sheet feeder 81 is a device that supplies the recording medium W to the image forming apparatus 10 and includes a feed roller 81a that rotates while supporting the wound recording medium W, and a guide roller 81b. The feed roller 81a is a support member that is rotatably supported by a rotation shaft extending in the conveyance width direction and externally fits and engages with a spool (not illustrated) that is a jig of the recording medium W. The feed roller is also a driven shaft that rotates counterclockwise together with the spool when the recording medium W is fed from the wound outer side. In addition, the feed roller 81a preferably has a structure in which an appropriate load is applied to a rotation, such as a torque limiter, so as not to slacken the recording medium W by unnecessarily rotating with respect to the feed amount of the recording medium W by the conveyance mechanism 7. Alternatively, the feed roller 81a may be an active shaft rotated by a motor. The guide roller 81b can have a configuration similar to that of the guide rollers 73 and 74 of the conveyance mechanism 7, is provided as necessary, and as many guide rollers as needed are installed.

(Winding Device)

The winding device 82 is a device that winds and stores the recording medium W having an image formed thereon discharged from the image forming apparatus 10 and includes a winding roller 82a that rotates to wind the recording medium W, a guide roller 82b, and a motor (not illustrated) that rotationally drives the winding roller 82a. The winding roller 82a is an active shaft to which rotational motion is transmitted from a motor to rotate around a rotation axis extending in the conveyance width direction and is also a support member which externally fits and engages with the spool and rotates the spool together counterclockwise to wind the recording medium W having an image formed thereon around the spool. The guide roller 82b can have a configuration similar to that of the guide rollers 73 and 74 of the conveyance mechanism 7, is provided as necessary, and as many guide rollers as needed are installed.

The sheet feeder 81 and the winding device 82 may each include a conveyance roller with a similar configuration to the conveyance rollers 71 and 72 of the conveyance mechanism 7 as necessary. The sheet feeder 81 and the winding device 82 may include a tension arm (not illustrated) that displaces the driven shaft, and can suppress the slack of the recording medium W.

[Image Forming Method]

Figure 3A:
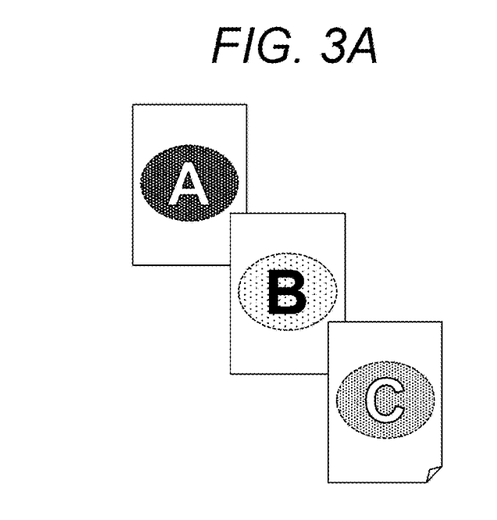
FIG. 3A is a schematic diagram of an image included in a job executed by the image forming apparatus according to an embodiment of the present invention.
Figure 3B:
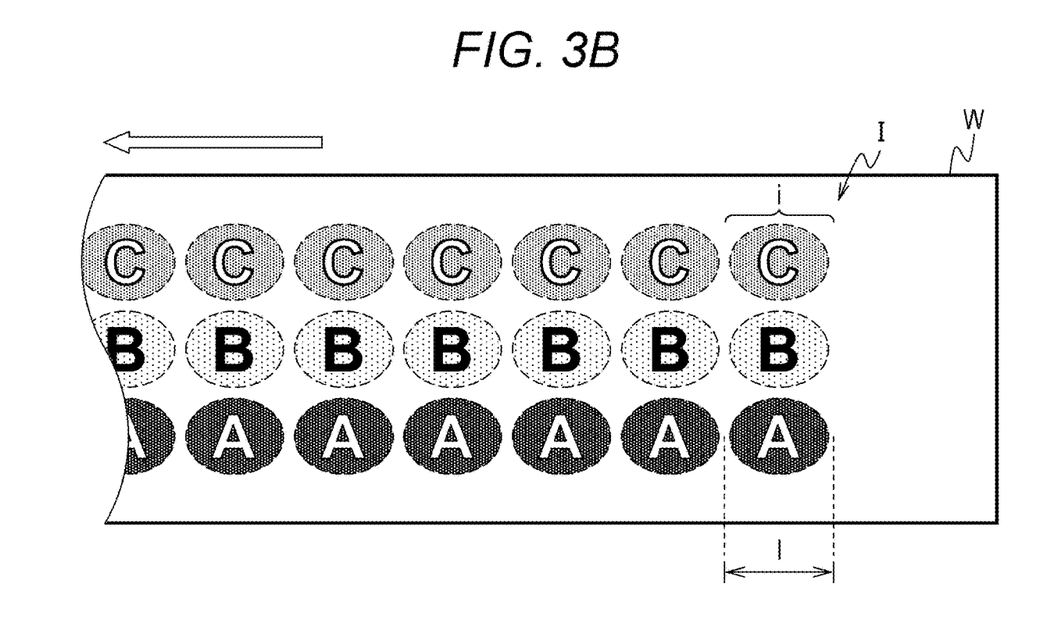
FIG. 3B is a schematic diagram of an image formed on a continuous recording medium by the image forming apparatus according to an embodiment of the present invention.
Figure 4A:
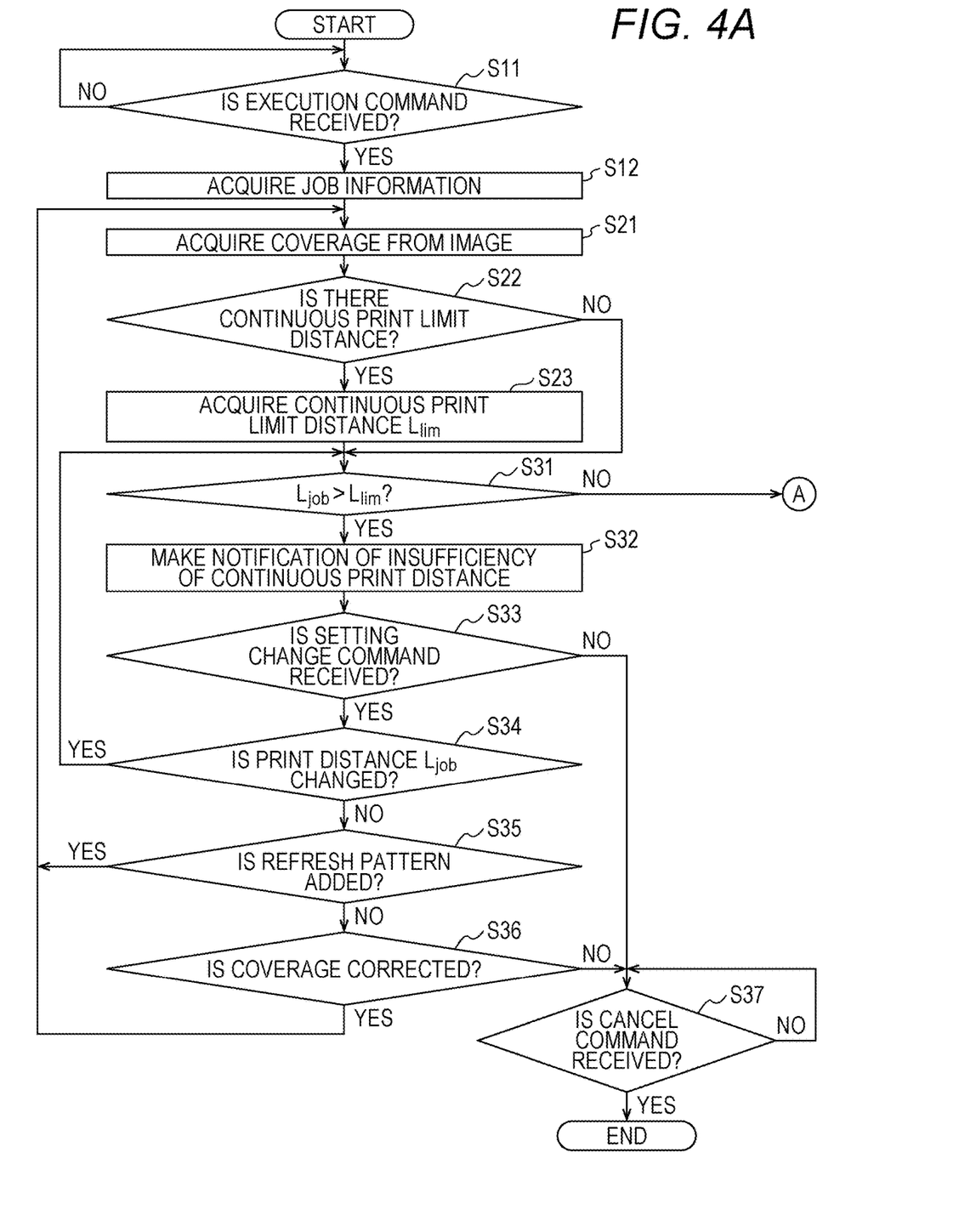
FIG. 4A is a flowchart illustrating an image forming method according to an embodiment of the present invention.
Figure 4B:
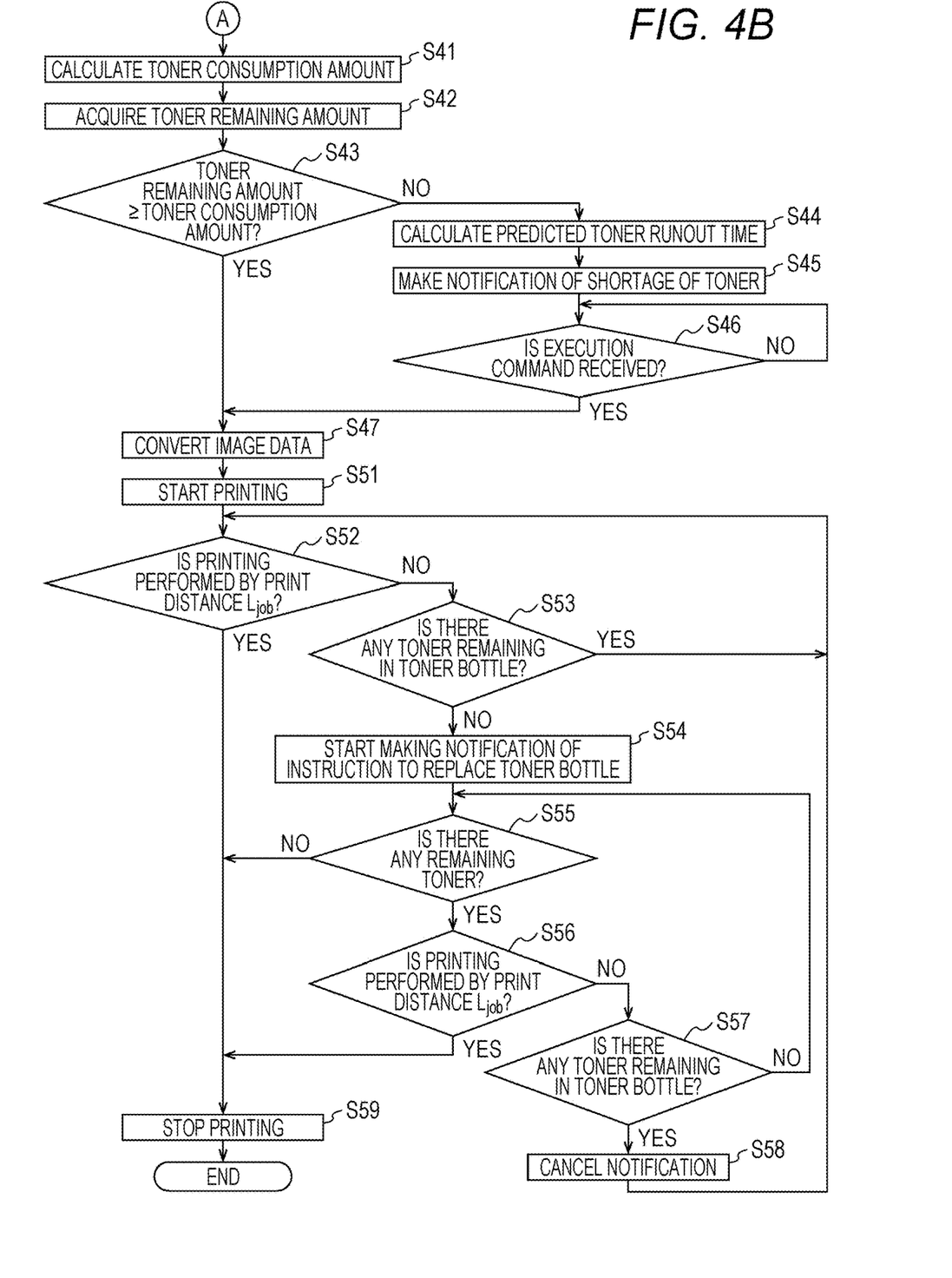
FIG. 4B is a flowchart illustrating the image forming method according to an embodiment of the present invention.

A job execution operation performed by the image forming apparatus according to the present invention will be described with reference to FIG. 1, FIG. 2, FIG. 3A, FIG. 3B, FIG. 4A, and FIG. 4B. The job includes information such as an image (a unit image) i, the pitch 1 of arrangement of the images i, the number of arrangements of the images i (the number of copies), and the type (the material, thickness, basis weight, and the like) and width of the recording medium (continuous recording medium) W and may further include print conditions (machine settings of the image forming apparatus 10). In the present embodiment, as an example, the image included in the information included in the job includes three types of images in which "A", "B", and "C" are drawn as illustrated in FIG. 3A. These three types of images are arranged one by one in a row in the print width direction to form one set of the unit image i. Then, data (image data) of an image I arranged (imposed) as illustrated in FIG. 3B is created on the basis of the pitch 1 of arrangement and the number of arrangements by software or the like built in a PC. In FIG. 3B, the conveyance direction of the recording medium W in printing is indicated by a white arrow. The image processing unit 22 receives the data of the image I, converts the data into data in a print file format (for example, page description language (PDL) data), further performs rasterization processing to convert the data into bitmap data, and the drive controller 21 allows the image I to be printed on the recording medium W. Alternatively, in the image forming apparatus 10, the image processing unit 22 may convert the data of the image i with the print length 1, and print the image i by the specified number of copies at the print pitch 1. In FIG. 3B, one set of the unit image i incudes 1×3 images obtained by arranging three types of images one by one in a row, but for example, may include 2×3 images obtained by arranging three types of images one by one in two rows. Furthermore, in the case of one type of image, the unit image i can be formed by arranging the images whose number is based on the dimension in the print width direction (for example, three images) in a row or two or more rows. Furthermore, images in which only the color is changed for every set or for every several sets can also be used. Note that a broken line as a contour line of the image in FIG. 3B indicates a cutting line, not a printed image, and the recording medium W is divided into elliptical pieces in a later process.

The drive controller 21 sets a print speed (a linear velocity) on the basis of the type of the recording medium W, the machine setting of the image forming apparatus 10, a room temperature, and the like, and drives the conveyance mechanism 7 to convey the recording medium W. The drive controller 21 further drives the image forming unit 4, the intermediate transfer unit 5, and the fixing unit 6, and causes the exposure device 43 to form an electrostatic latent image based on the bitmap data converted by the image processing unit 22 on the surface of the photosensitive drum 41. In addition, when receiving that the amount of toner in the housing is less than a threshold from the toner detector of the development device 44, the drive controller 21 drives the stirring conveyor of the sub-hopper 33 to maintain the amount of toner in the development device 44 to be substantially constant. Then, when receiving that the amount of toner in the sub-hopper 33 is less than a threshold from the toner amount detector of the sub-hopper 33, the drive controller 21 drives the stirring conveyor of the hopper 32 to fill the sub-hopper 33 with toner. Furthermore, when receiving that the amount of toner in the hopper 32 is less than a threshold from the toner amount detector of the hopper 32, the drive controller 21 drives the motor of the toner bottle attachment portion 31 to rotate the toner bottle T a predetermined number of times, thereby filling the hopper 32 with toner. Furthermore, the drive controller 21 may display the state of the image forming apparatus 10, for example, print conditions such as the name and content of the job being executed (the image i, the number of copies, the print distance, the type of the recording medium W, and the like) and a print speed, a scheduled time (countdown) until the completion of the job (printing) and a completion rate, the remaining amount of toner in the toner bottles Ty, Tm, Tc, Tk, and Tw, the occurrence of machine trouble such as toner runout and paper jam, and the like on the display screen of the PC via the communication unit 23.

Note that, as an example, the remaining amount of toner in the toner bottle T (the remaining amount of the toner bottle) can be estimated by the toner remaining-amount detection unit 24 accumulating the number of rotations of the toner bottle T by the toner bottle attachment portion 31 from the time of replacement with the toner bottle T and multiplying the accumulated number of rotations by the toner discharge amount per rotation of the toner bottle T stored in advance. In addition, runout of toner in the toner bottle T (the remaining amount of zero) is received by the toner remaining-amount detection unit 24 from the toner zero detector of the toner bottle attachment portion 31.

According to the image forming apparatus 10, even if any one of the toner bottles Ty, Tm, Tc, Tk, and Tw becomes empty during the execution (printing) of the job, printing can be continued until the toner of the color in the hoppers 32 and 33 becomes empty and the amount of toner in the development device 44 is less than a developable amount. In particular, since the large-capacity hopper 32 is provided, printing can be performed for about five minutes or more after the toner in the toner bottle T has run out, although it depends on the consumption speed of the toner of the color. Therefore, by the operator replacing the toner bottle T attached to the toner bottle attachment portion 31 with a new one during this time, the job can be continuously executed. For this purpose, the image forming apparatus 10 according to the present invention determines whether toner is sufficient on the basis of the information included in the job and the remaining amount of the toner bottle before the execution of the job, and in a case where the toner is insufficient, a notification of the fact is made to prompt the operator to prepare a new toner bottle T.

Furthermore, depending on the coverage of the image i, it is difficult to continuously print the image i (while maintaining the pitch 1 of arrangement) in the number of copies specified in the job. Specifically, for each color of Y, M, C, K, and W included in the image i, when the coverage is lower than a certain predetermined value (for example, 5%), the supply amount per unit time of the toner of the color from the development device 44 is excessively small. Then, the toner remains in the development device 44 while being stirred together with the carrier for an excessively long time until being supplied to the surface of the photosensitive drum 41, and as a result, the toner is worn and deteriorated, the charge amount is reduced, and the adhesion amount to the photosensitive drum 41 is insufficient. Therefore, in a case where the value of the lowest coverage of each color of the image i is less than the predetermined value (5%), and further it is reached the upper limit (continuous print limit distance) $L_{lim}$ of a preset continuous print distance based on a stepwise threshold, the image forming apparatus 10 is configured to forcibly stop printing. On the other hand, in a case where the coverage is equal to or higher than another predetermined value (for example, 80%), the development device 44 increases the density of carrier (decreases the density of toner) in the developer and increases the toner charging amount with a large amount of carrier in order to attach the toner to the photosensitive drum 41 at a high density. Therefore, in the development device 44, the carrier is supplied together with the toner, but if a large amount of toner is supplied from the sub-hopper 33 for consumption of a large amount of toner (for supplying the toner to the photosensitive drum 41) and a large amount of carrier is also supplied accordingly, the developer in the housing gradually increases without being caught up with the discharge of the developer, and there is a risk that the developer eventually exceeds the capacity and the development device fails. In order to avoid this, the continuous print limit distance $L_{lim}$ based on the coverage is set. Therefore, as described below, the image forming apparatus 10 determines whether information included in a job can be performed before the execution of the job. Note that the image forming apparatus 10 may set, as an engine limit, the upper limit of the continuous print distance regardless of the coverage of the image i (for example, 300 m), and may be configured to make a notification of the fact in a case where the print distance based on the designated number of copies in the job exceeds the upper limit.

When the user operates a PC to select a job and transmit an execution command for the job, the controller 2 of the image forming apparatus 10 receives the execution command via the communication unit 23 (a job receiving step S11, YES) and further acquires information (job information) included in the job (S12). Then, the continuous print-distance calculation unit 25 performs a continuous print distance calculation step S2 of calculating the continuous print limit distance $L_{lim}$ based on the coverage for each of the colors of Y, M, C, K, and W included in the unit image i from the unit image i included in the job information (see, for example, JP 2020-28351 A). Specifically, first, the coverage is acquired from the unit image i (S21), and if the coverage is within the range in which there is no limit of continuous printing (S22) or if there is a limit (S22, YES), the continuous print limit distance $L_{lim}$ stored in advance on the basis of the coverage is acquired (S23).

The determination unit 27 determines whether there is a continuous print limit distance $L_{lim}$ smaller than a print distance $L_{job}$ (if not included in the job information, the pitch 1 of arrangement is multiplied by the number of copies) based on the job included in the job information (S31). If there is not such a continuous print limit distance $L_{lim}$ (S31, NO), the toner consumption amount calculation unit 26 calculates the toner consumption amount necessary for printing the image I for each color on the basis of the image I of the job information (a toner consumption amount calculation step S41). At this time, the toner consumption amount per unit image i can be calculated and then multiplied by the number of copies. Furthermore, for example, in a case of alternately repeatedly printing images in which two sets of ten rows of the unit image i have different colors, the toner consumption amount calculation unit 26 can calculate the toner consumption amount for 20 rows to obtain the toner consumption amount of the image I. Alternatively, the consumption amount for 20 rows can be divided to obtain an average consumption amount per row or per a plurality of rows of the image i. Further, the toner remaining-amount detection unit 24 acquires, for each color, the remaining amount of the toner bottle and the remaining amount of toner in the image forming apparatus 10 (the hoppers 32 and 33, and the development device 44), and calculates the total toner remaining amount by adding up the remaining amount of the toner bottle and the toner remaining amount in the image forming apparatus (a toner remaining amount acquisition step S42). As described above, the remaining amount of the toner bottle is estimated by multiplying the accumulated number of rotations of the toner bottle T by the toner discharge amount per rotation of the toner bottle T. Here, in order not to erroneously determine that the toner is sufficient even though the toner is actually insufficient, it is preferable that the toner remaining-amount detection unit 24 estimates the total remaining amount of toner to be small. For example, a large value in an error range is used as the toner discharge amount per rotation of the toner bottle T, and the remaining amount of toner in each of the hoppers 32 and 33 and the development device 44 is assumed to be an amount immediately before supply. The degree of these estimates may be changeable by the user operating the PC or the operation panel of the image forming apparatus 10. On the contrary, the toner consumption amount calculation unit 26 preferably estimates and calculates the toner consumption amount to be large.

Figure 5:
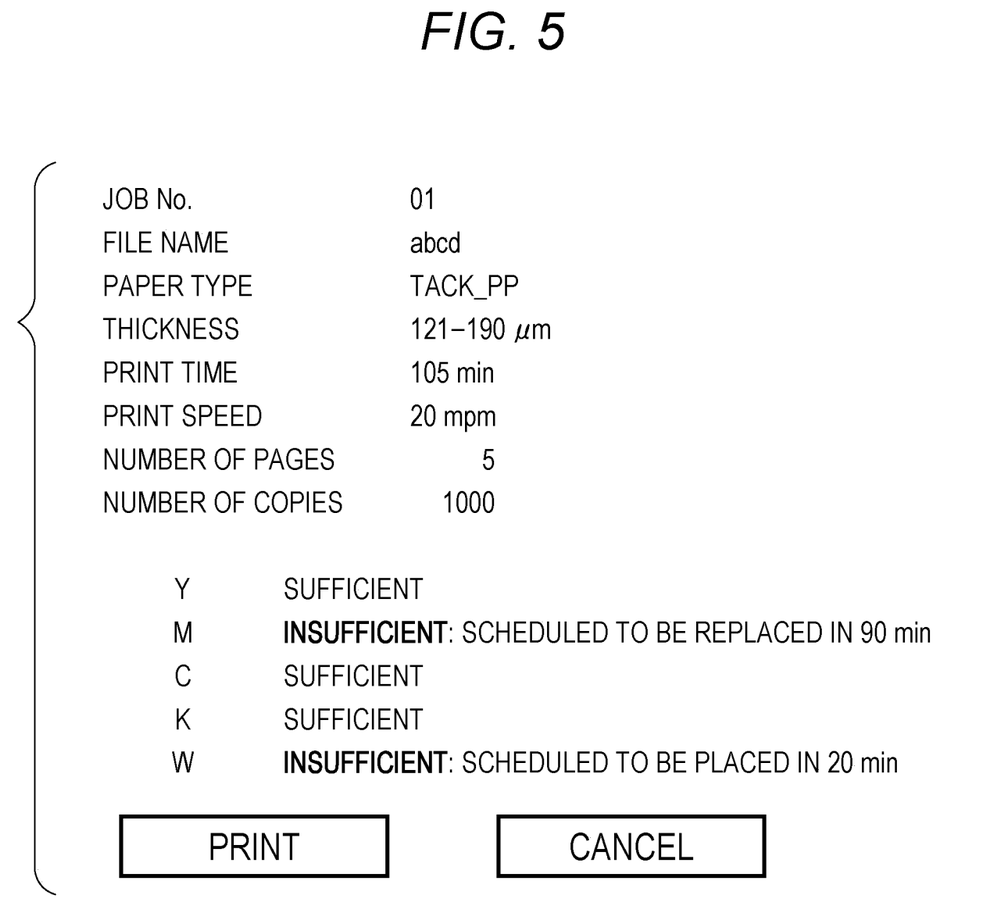
FIG. 5 is a schematic diagram in which a notification by the image forming apparatus according to an embodiment of the present invention is displayed.

The determination unit 27 compares the toner remaining amount calculated by the toner remaining-amount detection unit 24 with the toner consumption amount calculated by the toner consumption amount calculation unit 26 for each color (S43), and if the toner remaining amount is equal to or more than the toner consumption amount for all colors (S43, YES), the image processing unit 22 converts the data of the image I (or the image i) (S47) and starts printing the image I (S51). Then, when printing is performed by the print distance $L_{job}$ (S52, YES), printing is stopped (S59), and the job is completed. On the other hand, if there is a color in which the toner remaining amount is less than the toner consumption amount (S43, NO), as illustrated in FIG. 5, the shortage of the toner of the color is displayed together with a print execution command button on the display screen of the PC or the operation panel of the image forming apparatus 10 (S45). Furthermore, the determination unit 27 can also calculate (S44) and display the time from the start of printing to when the toner bottle T becomes empty (a predicted toner runout time) on the basis of the toner consumption amount per row or per a plurality of rows of the image i calculated by the toner consumption amount calculation unit 26 or the print speed set by the drive controller 21. When the print command is received again by the user clicking the print execution command button (S46, YES), the image I is printed (S47 and S51).

As described above, in a case where it is estimated that the toner is insufficient and there is a possibility that the toner shortage occurs in the middle of printing, the image forming apparatus 10 makes a notification of the possibility and suspends printing until the print execution command is received again. With such a configuration, the user makes preparations, for example, checks the stock of the toner bottle T so as to be able to quickly perform a replacement operation of the toner bottle T after the toner runs out, and then printing can be started. Furthermore, by making a notification of the predicted time until runout of toner, it is not necessary for the operator to always stand by the image forming apparatus 10 from the start of printing until the toner has run out. Note that when printing is started (S51), the predicted toner runout time may be updated (counted down) every second, for example. Further, when the print command is received again (S46, YES), steps S41, S42, and S43, step S44, and the like may be performed again on the basis of the machine setting of the image forming apparatus 10 and the room temperature at that time, and the like, and in a case where the predicted toner runout time and the like are different from those of the first time, this may be displayed together with the print execution command button (S45), and printing may be performed by further receiving the print command again (S46, YES). Even if the toners of all the colors are sufficient (S43, YES), this may be displayed together with the print execution command button, and printing of the image I may be suspended until the print command is received (S46, YES). Alternatively, if it is estimated that the toner is insufficient, the image forming apparatus 10 may only make a notification and perform printing. Furthermore, in a case where the predicted toner runout time is less than a threshold, that is, in a case where it is necessary to replace the toner bottle T in a short time from the start of printing, printing can be suspended until the print execution command is received again. This threshold may be settable by the user.

During printing (S52, NO), if the toner remaining-amount detection unit 24 receives that the toner bottle T has become empty from the toner zero detector of the toner bottle attachment portion 31 (S53, NO), a notification of an instruction to replace the toner bottle T is made (S54). Then, if the toner bottle T is replaced with a new toner bottle T by the operator and the toner bottle T is no longer empty (S57, YES) before the toner in the image forming apparatus 10 (the hoppers 32 and 33, and the development device 44) runs out (S55, YES), the notification is canceled (S58), and printing is continued. Alternatively, if printing is performed by the print distance $L_{job}$ (S56, YES), printing is stopped (S59), and the job is completed. On the other hand, if the toner bottle T is not replaced and the toner in the image forming apparatus 10 has run out (S55, NO), printing is stopped (S59), and the job is suspended. Note that the notification of the instruction to replace the toner bottle T may be made not only by display on the display screen of the PC or the operation panel of the image forming apparatus 10, but also by illumination or sound, for example, by an illumination device such as a rotating lamp, a buzzer attached to the image forming apparatus 10, or the like.

If there is a color in which the continuous print limit distance $L_{lim}$ acquired in the continuous print distance calculation step S2 is smaller than the print distance $L_{job}$ based on the job (S31, YES), the determination unit 27 displays the continuous print limit distance $L_{lim}$ (in a case where there is a plurality of colors, the minimum value), the fact that this value is less than the print distance $L_{job}$, a setting change button, a cancel button, and the like (S32). At the same time, the excess or deficiency of the coverage may be displayed together with the color. If the setting change command is received by the user operating the setting change button (S33, YES), the job correction unit 28 displays a job setting change screen, and performs any one of shortening or division of the print distance $L_{job}$ (the number of copies) (S34, YES), addition of a pattern for toner discharge (a refresh pattern) to a margin of the image I (S35, YES, see, for example, JP 5741656 B), and correction of the coverage of the image i (S36, YES, see, for example, JP 2020-28351 A) by the selection of the user. Here, in a case where the continuous print limit distance $L_{lim}$ is insufficient due to high coverage, the addition of the refresh pattern cannot be applied. Alternatively, the addition of the refresh pattern cannot be applied to a case where there is no margin (no edges of the recording medium W, no gap between the images i, or the like) to which the refresh pattern can be added.

In a case where the print distance $L_{job}$ is divided, printing is performed by leaving a margin after each continuous print distance (a print distance at the print pitch 1) set by the user to be equal to or less than the continuous print limit distance $L_{lim}$. The refresh pattern (the refresh band) is printed in the margin (see, for example, JP 6278033 B), or in a case where the continuous print limit distance $L_{lim}$ is insufficient due to high coverage, the margin is a blank, and the development device 44 discharges an excess developer during conveyance after printing is stopped. The continuous print distance calculation step S2 is performed again on the job whose setting has been changed, and if there is no continuous print limit distance $L_{lim}$ smaller than the print distance $L_{job}$ or the continuous print distance obtained by division (S31, NO), the toner consumption amount calculation step S41 is performed. In addition, if a job cancel command is received by the operation of the cancel button (S37, YES), the processing is ended without executing the job.

[Modifications]

The present invention is not limited to the above embodiments, and modifications can be made without departing from the gist of the present invention, and examples thereof include the following modes.

In a case where the job executed by the image forming apparatus 10 is adjusted in advance and registered in such a manner that the print limit distance $L_{lim}$ based on the coverage does not fall below the print distance $L_{job}$, the continuous print distance calculation step S2 and the subsequent steps S31 to S36 do not need to be performed. Here, these steps are preferably performed in a case where a setting update command to increase the continuous print distance (the number of copies) in the job is received, or after the setting of the toner adhesion amount and the like are updated in the machine setting of the image forming apparatus 10.

According to the image forming apparatus of an embodiment of the present invention, it is possible to more reliably prevent suspension of printing due to runout of the recording agent at the time of the execution of the print job.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a first hardware processor that, when receiving an execution command of a job related to formation of an image on a continuous recording medium, calculates a consumption amount of a recording agent on a basis of information of the job; and
   a second hardware processor that determines whether the recording agent is sufficient on a basis of the consumption amount, wherein
   in a case where the second hardware processor determines that the recording agent is insufficient, a notification that the recording agent is insufficient is made;
   a third hardware processor that detects or calculates a remaining amount of a recording agent in a recording agent storage container attached; and
   a fourth hardware processor that detects or calculates a remaining amount of the recording agent in the image forming apparatus;
   wherein the second hardware processor determines whether the recording agent is sufficient on a basis of a sum of the remaining amount of the recording agent in the recording agent storage container and the remaining amount of the recording agent in the image forming apparatus;
   wherein in a case where the second hardware processor determines that the recording agent is insufficient, execution of the job is suspended until an execution command of the job is received again;
   wherein the job includes one or more pieces of information of a coverage of each color in an image, a continuous print distance, a total print distance, a type of a continuous recording medium, and a machine setting of the image forming apparatus;
   wherein by receiving an estimate change command, at least one of the third hardware processor or the fourth hardware processor changes a constant for calculating a remaining amount of a recording agent.

2. The image forming apparatus according to claim 1, wherein the image is formed by repeatedly arranging unit images.

3. The image forming apparatus according to claim 2, wherein the first hardware processor calculates a consumption amount of a recording agent per unit print distance and calculates the consumption amount of the recording agent consumed in the job by multiplying the consumption amount of the recording agent per unit print distance by the total print distance.

4. The image forming apparatus according to claim 3, wherein
   when determining that the recording agent is insufficient, the second hardware processor calculates at least one value of a print distance possible with a remaining amount of the recording agent, a print time taken to perform printing by the print distance, and a time from start of printing until the recording agent storage container becomes empty, and
   a notification of a value calculated by the second hardware processor is made.

5. The image forming apparatus according to claim 4, wherein after start of execution of the job, a time until the recording agent storage container becomes empty is updated every predetermined time and a notification of the time is made.

6. The image forming apparatus according to claim 1 further comprising a recording agent zero detector that detects that the recording agent storage container becomes empty, wherein
   a notification that the recording agent storage container becomes empty is made.

7. The image forming apparatus according to claim 1, wherein the recording agent includes a toner.

8. The image forming apparatus according to claim 7, wherein the toner includes a white toner.

9. The image forming apparatus according to claim 7 further comprising a fifth hardware processor that, when receiving an execution command of the job, acquires a coverage of an image from information included in the job, and calculates a continuous print distance by which printing can be continuously performed, wherein
   the second hardware processor determines whether the job can be executed on a basis of a print distance calculated by the fifth hardware processor, and
   in a case where the second hardware processor determines that the job cannot be executed on a basis of the print distance, a notification that the job cannot be executed is made.

10. The image forming apparatus according to claim 9 further comprising a sixth hardware processor that, in a case where the second hardware processor determines that the job cannot be executed on a basis the print distance, when receiving a command to change information included in the job, changes the information, wherein
    the first hardware processor calculates the consumption amount on a basis of information changed by the sixth hardware processor.

11. The image forming apparatus according to claim 10, wherein the sixth hardware processor performs, for information included in the job, any of addition of a pattern for discharging a recording agent to an area outside an area where an image included in the information is formed, shortening of the continuous print distance, and a change of a coverage of the image.

12. An image forming apparatus comprising:
a first hardware processor that, when receiving an execution command of a job related to formation of an image on a continuous recording medium, calculates a consumption amount of a recording agent on a basis of information of the job; and
a second hardware processor that determines whether the recording agent is sufficient on a basis of the consumption amount, wherein
in a case where the second hardware processor determines that the recording agent is insufficient, a notification that the recording agent is insufficient is made;
a third hardware processor that detects or calculates a remaining amount of a recording agent in a recording agent storage container attached; and
a fourth hardware processor that detects or calculates a remaining amount of the recording agent in the image forming apparatus;
wherein the second hardware processor determines whether the recording agent is sufficient on a basis of a sum of the remaining amount of the recording agent in the recording agent storage container and the remaining amount of the recording agent in the image forming apparatus;
wherein in a case where the second hardware processor determines that the recording agent is insufficient, execution of the job is suspended until an execution command of the job is received again;
wherein the job includes one or more pieces of information of a coverage of each color in an image, a continuous print distance, a total print distance, a type of a continuous recording medium, and a machine setting of the image forming apparatus;
wherein the image is formed by repeatedly arranging unit images;
wherein the first hardware processor calculates a consumption amount of a recording agent per unit print distance and calculates the consumption amount of the recording agent consumed in the job by multiplying the consumption amount of the recording agent per unit print distance by the total print distance;
wherein
when determining that the recording agent is insufficient, the second hardware processor calculates at least one value of a print distance possible with a remaining amount of the recording agent, a print time taken to perform printing by the print distance, and a time from start of printing until the recording agent storage container becomes empty, and
a notification of a value calculated by the second hardware processor is made;
wherein
when receiving an execution command of the job while execution of the job is suspended, the second hardware processor calculates the value again, and
in a case where the value is different from a previously calculated value, a notification of a newly calculated value is made, and the execution of the job is suspended until the execution command of the job is received again.

13. An image forming method comprising:
receiving an execution command of a job;
calculating a consumption amount of a recording agent on a basis of information included in the job via a first hardware processor;
determining whether the job can be executed on a basis of a remaining amount of the recording agent and the consumption amount via a second hardware processor; and
forming an image based on the information on a continuous recording medium with the recording agent, wherein
in a case where it is determined in the determining that the job cannot be executed, making a notification that the job cannot be executed is performed, and performing of the forming is suspended until the execution command of the job is received again;
detecting or calculating a remaining amount of a recording agent in a recording agent storage container attached via a third hardware processor; and
detecting or calculating a remaining amount of the recording agent in the image forming apparatus via a fourth hardware processor;
wherein the second hardware processor determines whether the recording agent is sufficient on a basis of a sum of the remaining amount of the recording agent in the recording agent storage container and the remaining amount of the recording agent in the image forming apparatus;
wherein in a case where the second hardware processor determines that the recording agent is insufficient, execution of the job is suspended until an execution command of the job is received again;
wherein the job includes one or more pieces of information of a coverage of each color in an image, a continuous print distance, a total print distance, a type of a continuous recording medium, and a machine setting of the image forming apparatus;
wherein by receiving an estimate change command, at least one of the third hardware processor or the fourth hardware processor changes a constant for calculating a remaining amount of a recording agent.

* * * * *